Figure 1:
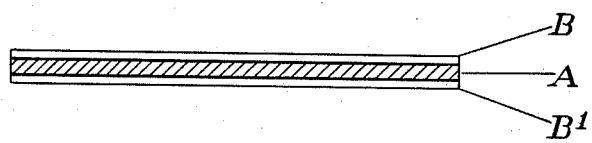

May 10, 1938.  G. R. ENSMINGER  2,117,085

PROCESS OF PREPARING LAMINATED MATERIAL

Filed Sept. 28, 1933

George R. Ensminger INVENTOR.
BY
Paul J. Culhane ATTORNEY.

Patented May 10, 1938

2,117,085

UNITED STATES PATENT OFFICE 2,117,085

PROCESS OF PREPARING LAMINATED MATERIAL

George R. Ensminger, New Brunswick, N. J., assignor to E. I. du Pont de Nemours & Company, Wilmington, Del., a corporation of Delaware Application September 28, 1933, Serial No. 691,343

4 Claims. (Cl. 154—2)

This invention relates to a laminated material and more particularly a laminated material having plies of metal and wood.

The construction material commonly known as wood veneered metal is composed of a plurality of layers of wood to which is attached a sheet of metal forming the outermost surface. This structure is produced by means of an adhesive such as glue as applied between the several laminations and the whole is then subjected to heat and pressure to form a compact unit. The product is useful in truck body construction and similar structures where reduced weight combined with high strength is desirable.

Wood veneered metal, the outer layer of which is composed of ordinary sheet steel or other metal subject to corrosion on exposure is defective in that it cannot be stored for any substantial period prior to construction and finishing the truck body, etc. During normal storage periods considerable rusting occurs, this factor being obviously detrimental to a satisfactory ultimate decorative and protective finish made in accordance with any of the finishing systems known in the art.

Numerous attempts have been made to eliminate this defect. Prior to uniting the plywood to the metal sheet the metal has been treated with certain chemical reagents designed to improve rust resistance. Such treatment includes "galvannealing" and "bonderiting", the first being a process wherein the metal is dipped in molten zinc and then annealed, the second being a process wherein the metal is dipped in a hot bath of a solution of iron and manganese phosphates whereby a thin film of iron phosphate is produced on the surface of the sheet iron. These methods and others of similar nature afford some improvement with respect to rust resistance during storage but still leave much to be desired.

This invention has as an object the provision of a wood veneered metal of improved resistance to corrosion during an extended storage period. Another object is the provision of a wood veneered metal of improved anchorage for the ultimate decorative and protective finish coats which will retain this property for long periods after the application of the top coat without peeling or cracking tendencies. Another object of the invention is a process of so treating the metal sheet prior to uniting to the other elements of the assembly that material improvement in rust resistance and adhesion of top coat finishes are effected. A further object is a method of coating the metal sheet of the laminated structure prior to its union with the plywood with a material which will withstand forming operations. A further object is the provision of a practical and economically feasible commercial process for treating the sheet metal layer of the plywood veneer structure. Further objects will appear hereinafter.

These objects are accomplished by the use of a primer coat preferably of the baking type applied to sheet metal, either treated or untreated, prior to uniting the metal sheet to the plywood assembly.

In the attached drawing Figure 1 represents a sheet of metal coated on both sides with a primer prior to being cemented to the plywood base of the assembly. In Figure 1 A indicates a metal sheet such as auto body steel coated on both sides with a primer B and B' as applied prior to forming the completed veneered metal structure represented by Figure 2.

Figure 2:
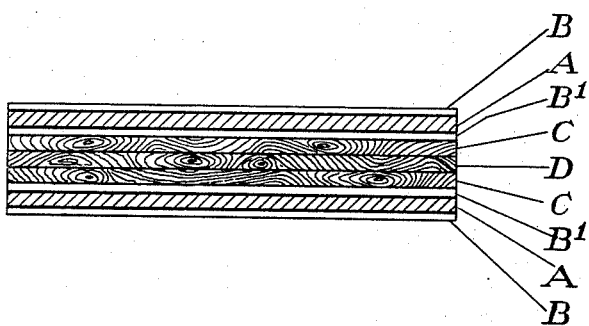

Figure 2 represents an assembly wherein two sheets of primed metal have been applied to a sheet of plywood, A representing the sheets of metal, B and B' the primer coating, and C and D the plywood.

The primer coating is preferably of the baking type but air-dry coatings are not precluded, Example 1, following, illustrates an oil type coating which has been found suitable.

*Example I.—Oil type primer*

| Base formula | Percent |
|---|---|
| Lithopone | 34.57 |
| Basic sulfate white lead | 34.57 |
| Zinc oxide | 9.16 |
| Lamp black | 0.10 |
| Mineral spirits | 6.48 |
| Perilla oil | 5.10 |
| China-wood oil | 7.57 |
| Blown linseed oil | 2.45 |
| | 100.00 |

In the above, the pigment is mixed thoroughly in the grinding vehicle and put through a roller mill or a buhrstone mill to effect proper dispersion. To this base then, other ingredients are added and thoroughly mixed as in the following proportions:

Ultimate formula | Percent
---|---
Above base | 63.96
Japan varnish* | 9.10
Turpentine | 4.00
Mineral spirits | 22.94
 | 100.00

*The Japan varnish is prepared according to standard practice well known in the art and comprises essentially the following ingredients:

| | Percent |
|---|---|
| Rosin | 7.5 |
| Glycerine | 0.7 |
| Copal gum | 4.6 |
| Linseed oil | 15.2 |
| Drier (red lead and lead acetate) | 2.7 |
| China-wood oil | 8.7 |
| Turpentine | 15.8 |
| Mineral spirits | 44.8 |
| | 100.0 |

Coatings other than the oil type primer described in Example I may be used such as coatings based on pyroxylin or synthetic resins (phenol-formaldehyde, polyhydric alcohol-polybasic acid resin, etc.). A primer of the baking type is, however, preferable because of its general superiority in anchorage for top coats, its resistance to rust and its durability. Example II, following, is illustrative of a synthetic resin primer of the baking type.

*Example II*

| | Percent |
|---|---|
| Iron oxide | 8.22 |
| Lamp black | 1.59 |
| Asbestine | 3.78 |
| China clay | 4.73 |
| Talc | 3.78 |
| Litharge | .35 |
| Synthetic resin* | 11.82 |
| Hi-flash naphtha | 20.85 |
| Mineral spirits | 18.26 |
| Toluene | 26.62 |
| | 100.00 |

*The synthetic resin ingredient in this composition is a reaction product of:

| | Percent |
|---|---|
| Glycerol | 19.3 |
| Linseed oil acids | 29.6 |
| Phthalic anhydride | 37.6 |
| China-wood oil | 13.5 |
| | 100.0 |

This resin is prepared by charging the above ingredients into an aluminum kettle fitted with a mechanical stirring device and a thermometer. The batch was heated up to 225° C. in one hour and held at this temperature until an acid number of 30 was reached, stirring being maintained throughout the run. The heating cycle was about 4–6 hours.

This primer is preferably baked at 160° F. for two or three hours. The primer is preferably applied by dipping.

Figure 2 in the drawing illustrates a composite structure including primed metal laminations on both sides. This completed product is manufactured according to the methods known in the art in which an adhesive is applied to the several surfaces of the lamination, the various layers assembled, as indicated, and the whole subjected to heat and pressure to form a compact and unified structure.

Where storage of the metal sheet is not contemplated and the assembly is to be made immediately, the sheet may be coated with the primer on only one side, thus providing adequate rust resistance to the exposed surface and insuring suitable anchorage for the finish coats. In this instance, then, in referring either to Figure 2 or Figure 1 the coating represented by B' is omitted. The process of the present invention includes structures where but one primed metal sheet is cemented to a single thickness of wood or to a single thickness of plywood. To provide for differences in the coefficient of linear expansion between the wood and metal laminations, a strip of fabric coated and impregnated with an adhesive may be placed between the metal and wood surface.

The use of the primer coat on metal sheets which have been previously chemically treated as, for example, by "galvannealing" or "bonderiting" is also within the scope of the present invention. "Galvannealed" metal is defective in anchorage for the protective and decorative top coats, which defect is eliminated by the use of the primer coat particularly that of the baking type. The use of the primer coat likewise is superior to the use of "bonderited" metal, in the superior anchorage for the top coats as well as in rust resistance. Other modifications of the process will be apparent to those skilled in the art in which the type of construction illustrated in Fig. 2 is of great value in the manufacture of truck bodies, railway coaches, etc., the improvements afforded by the use of a primer as indicated adding materially to the flexibility of the process and the anchorage and rust resistance of the finishing coats.

Wood veneered metal is manufactured according to processes well known in the art. A plurality of wood sheets are cemented together by the use of adhesives applied by the layers of wood. A sheet of metal such as auto-body steel is affixed to one or both surfaces of the plywood in the same manner and the whole assembly then subjected to heat and pressure to form a contact for uniform structure. The adhesive may be applied to the wood laminations and to the metal sheets by brushing or dipping, preferably brushing. If an adhesive such as glue is used the unified structure is permitted to cool in the press since this type of adhesive sets up in this manner. If an adhesive such as phenol-formaldehyde resin is used, the adhesion is gained by chemical change that is, "curing" of the resin and cooling in the press is therefore unnecessary. Animal or vegetable glues, casein, and certain synthetic resin adhesives may be used. The synthetic resin-nitrocellulose adhesives of the copending application of Donald Edgar, Serial No. 658,270, filed February 23, 1933, may be used. Polyhydric alcohol-polybasic acid resins, phenol-formaldehyde resins, and pyroxylin adhesives may be used.

In the manufacture of wood veneered metal it is frequently necessary to store the metal sheets forming the outermost layer of the structure for varying periods before use in the assembly. The final product with the metal sheet cemented to the plywood base but with its surface exposed may likewise be stored for considerable periods before use in construction, for example, of truck bodies. During these storage periods, a sheet metal surface is exposed to rust and in general affords an undesirable condition for the application of finishing coats, thus requiring a further treatment immediately previous to application of the veneering coats, a treatment which is obviously expensive in time, labor, and money. The number of methods which have been developed in an attempt to overcome this indicate the importance of the problem, but all of the methods hitherto employed suffer from at least one of the two defects of inadequate resistance to corrosion or inadequate anchorage for further coatings. The use of a primer coat, and particularly the use of a baking primer coat provides a process which avoids these defects. The trouble and expense incident to a chemical treatment of the metal sheet to reduce rusting during storage is eliminated although the use of such treatments in combination with a primer coat is not excluded from the scope of this present invention. The improved wood veneered metal of the present invention provides a satisfactory base for the application of finishing coats in contrast with the previous methods which did not afford adequate anchorage. Ordinary auto body steel, when coated with the primer, affords a satisfactory base for the wood veneered metal product. The uncoated material is quite prone to rust even on relatively short storage periods, but a coated material may be stored for extended periods without adverse effects.

The baking primer compositions shown in Examples I and II are sufficiently flexible to withstand forming operations so that the sheet metal may be coated therewith, stored until ready for use, and then applied to the laminated wood structure in the desired form. This process which provides for the application of the primer to the metal sheet separately followed by a baking operation thus affords a means of utilizing a baked coating with its advantages in superior rust resistance anchorage for finishing coats and general durability. A baking primer cannot be utilized after the assembly of the metal and plywood because the wood cannot stand the heat required to bake the primer effectively.

The use of the primer coating in combination with the other elements of wood veneered metal structure simplifies the final finishing operations in the construction of truck bodies, railroad coaches, etc., in that the base for the finishing coats is already in place. The method of the present invention is economically advantageous in that chemical pretreatment of the metal is not required. This permits the use of ordinary auto body steel. The use of the primer coat on the metal sheet has the further advantage in that the proper primer may be applied thus reducing the chance for unsatisfactory adhesion of finishing coats applied after the laminated structure has passed from the hands of the manufacturer.

As many apparently widely different embodiments of this invention may be made without departing from the spirit and scope thereof, it is to be understood that I do not limit myself to the specific embodiments thereof except as defined in the appended claims.

I claim:

1. In the process of preparing laminated material in which at least one metal sheet is joined to wood by means of an adhesive, the improvement which comprises the step of applying a priming coat to the surface of the metal to be in contact with the adhesive, said priming coat being selected from the class consisting of alkyd resins and primers of the oil type.

2. Process of claim 1 which includes the step of baking the priming coat.

3. Process of claim 1 which includes the step of coating both surfaces of the metal with the primer.

4. Process of claim 1 which includes the step of dipping the metal in the priming composition.

GEORGE R. ENSMINGER.